United States Patent [19]

Heneveld, Sr.

[11] Patent Number: 5,762,213

[45] Date of Patent: Jun. 9, 1998

[54] ADJUSTABLE STORAGE SYSTEM

[75] Inventor: William R. Heneveld, Sr., Grand Rapids, Mich.

[73] Assignee: Windquest Companies, Inc., Holland, Mich.

[21] Appl. No.: 701,577

[22] Filed: Aug. 22, 1996

[51] Int. Cl.[6] .................................................. A47F 5/00
[52] U.S. Cl. ............................. 211/187; 211/184; 108/109
[58] Field of Search ............................... 211/187, 186, 211/184, 59.2, 46, 47; 312/350, 257; 108/107, 109

[56] References Cited

U.S. PATENT DOCUMENTS

| | | | |
|---|---|---|---|
| 1,052,516 | 2/1913 | Ringer | 108/109 |
| 1,504,523 | 8/1924 | Sherer | 108/107 |
| 1,890,076 | 12/1932 | Cordes | 108/109 |
| 2,877,519 | 3/1959 | Propst | 211/186 X |
| 3,010,585 | 11/1961 | Slikkers | 108/107 |
| 3,044,631 | 7/1962 | Greenman et al. | 108/110 |
| 3,279,876 | 10/1966 | St. Cyr | 108/107 X |
| 3,295,695 | 1/1967 | Carnstrom | 211/148 |
| 3,450,451 | 6/1969 | Lyman, Jr. | 108/109 X |
| 3,481,485 | 12/1969 | Hess | 108/109 X |
| 3,534,863 | 10/1970 | Howard | 211/47 |
| 3,570,679 | 3/1971 | Edson | 211/47 |
| 4,015,545 | 4/1977 | Kurokawa | 108/107 |
| 4,540,222 | 9/1985 | Burrell | 211/186 X |
| 4,567,834 | 2/1986 | Pyka | 108/107 X |
| 4,595,105 | 6/1986 | Gold | 211/184 X |
| 4,928,833 | 5/1990 | Huizenga | 211/187 |
| 4,930,640 | 6/1990 | Edwards | 211/41 |
| 5,002,248 | 3/1991 | Knape et al. | 211/187 X |
| 5,004,202 | 4/1991 | Stumpf et al. | 211/187 X |
| 5,069,466 | 12/1991 | Propst | 312/350 X |
| 5,127,340 | 7/1992 | Maro et al. | 108/107 |
| 5,205,630 | 4/1993 | Welsch et al. | 211/187 X |
| 5,349,909 | 9/1994 | Smit et al. | 108/107 |
| 5,478,145 | 12/1995 | Kamachi | 211/187 X |
| 5,582,306 | 12/1996 | Balter et al. | 211/187 |

*Primary Examiner*—Robert W. Gibson, Jr.
*Attorney, Agent, or Firm*—Rader, Fishman, Grauer & McGarry

[57] ABSTRACT

An adjustable storage system which provides the flexibility to allow customization to fit individual and changing needs. The system is designed to be able to divide the provided storage space into smaller modules of a given size to expand the variety of storage options through use of application specific storage components. A divider panel is mounted to a conventional height-adjustable shelving system which creates additional modular spaces in the shelving system. A removably-mounted shelf is mounted to support members on vertical panels in the shelving system to further compartmentalize the storage system. The shelf can be mounted in multiple positions including both a horizontal and various inclined positions. Additional embodiments disclose a drawer-type tray, and other item-specific storage units, which are slidable between a retracted and an extended position.

13 Claims, 10 Drawing Sheets

ADJUSTABLE STORAGE SYSTEM

RELATED APPLICATION INFORMATION

This application claims the benefit of U.S. provisional patent application Ser. No. 60/002,634 filed Aug. 22, 1995.

BACKGROUND OF THE INVENTION

1. Field of the Invention

This invention relates to an adjustable storage system, and more particularly, to an adjustable storage system which allows division of space and provides components promoting more efficient and custom storage.

2. Description of the Related Art

Shelving systems have been known to comprise a pair of vertical panels having interior surfaces provided with at least two vertically aligned columns of recesses wherein the recesses are adapted to receive support members to hold one or more horizontal or angular shelves. The only requirement for mounting the support members within the recesses is that the support members define a single planar surface which provides sufficient support to a shelf. As both home and office furniture systems become more complex and specialized, it is becoming preferable to provide additional shelving components which provide additional customization, storage capacity, and functionality to a shelving system.

SUMMARY OF THE INVENTION

The invention is directed to an adjustable storage system which is easily adaptable to a wide variety of uses. The system includes a pair of opposed vertical panels, each panel having multiple recesses provided on the interior surface. The recesses are aligned in a pair of vertical columns. Within each column, the recesses are spaced vertically from one another. Support members are received in the recesses of the vertical panels for supporting the adjustable shelves. Preferably, one support member is provided in a recess for each of the several vertical columns. The adjustable shelves have a support surface and a pair of side edges extending therefrom. The side edges have multiple discontinuities formed therein to receive the support members and support the shelf thereon. Preferably, the discontinuities provided adjacent the front edge are U-shaped notches aligned so that the opposed sidewalls of the groove are substantially vertical when the support surface is horizontal. With this structure the forward discontinuities can receive the support members therein, but forward or rearward movement of the shelf with respect to the support members is restricted to the width of the notch. Preferably, the discontinuities provided adjacent the rear edge are also U-shaped notches, but the rear notch is elongated compared to the forward notch and the sidewalls of the rear notch are substantially perpendicular to the sidewalls of the front notch. The elongated configuration of the rear notches accommodates differing spacing between the support members received in the forward and rearward notches. The spacing of support members supporting the shelf in the horizontal position is different from the spacing of support members supporting the same shelf in a non-horizontal orientation.

The structure of the rear notch can take one of many different configurations. As noted above, it can comprise a U-shaped notch wherein the sidewalls of the U-shaped are perpendicular to the sidewalls of the front notch. This structure can be modified by removing the lower sidewall of the rear notch. A notch with this configuration will still support the shelf on the support member and accommodate support members in a variety of positions.

This storage system is designed to be able to divide the usable storage space into smaller modules of a given size to provide a means for multiple storage options. This subdivision of the storage space is accomplished when two horizontal shelves, supported between two vertical panels, are positioned at the proper relative height. Once positioned at the proper heights wire retaining members are installed in the horizontal shelves, one positioned on the underside of the upper shelf and another on top of the lower shelf. With the position of the wire retaining members in the same vertical plane, a vertical divider, with slots on its top and bottom, can be slid onto the wire retaining members, thus dividing the horizontal space.

Once the storage space has been divided into a module, comprising of the porper width and height, then specially designed storage accessory components can be used within the module to accommodate a variety of storage. One of the accessory components is a one piece shelf that can be mounted in multiple positions to accommodate the desired storage. The shelf can be positioned horizontally or in various inclined positions. The shelf is reversible such that in the horizontal position it has upwardly extending flanges at the rear of the storage unit. For use in variable inclined positions the shelf is rotated 180 degrees which positions the flanges to the front of the storage unit. With the flanges to the front and the shelf upwardly inclined toward the back of the storage unit, the flanges retain materials on the shelf. The initial application is to support the shelf on four pins.

In another aspect of the invention, the spacing of the sidewalls of at least one of the forward notches is only slightly greater than the diameter of the support members. However, the rear notches are elongated compared to the front notch, thereby accommodating differing spacing of the support members.

BRIEF DESCRIPTION OF THE DRAWINGS

The invention will now be described with reference to the drawings in which.

DETAILED DESCRIPTION OF THE PREFERRED EMBODIMENTS

Figure 1:
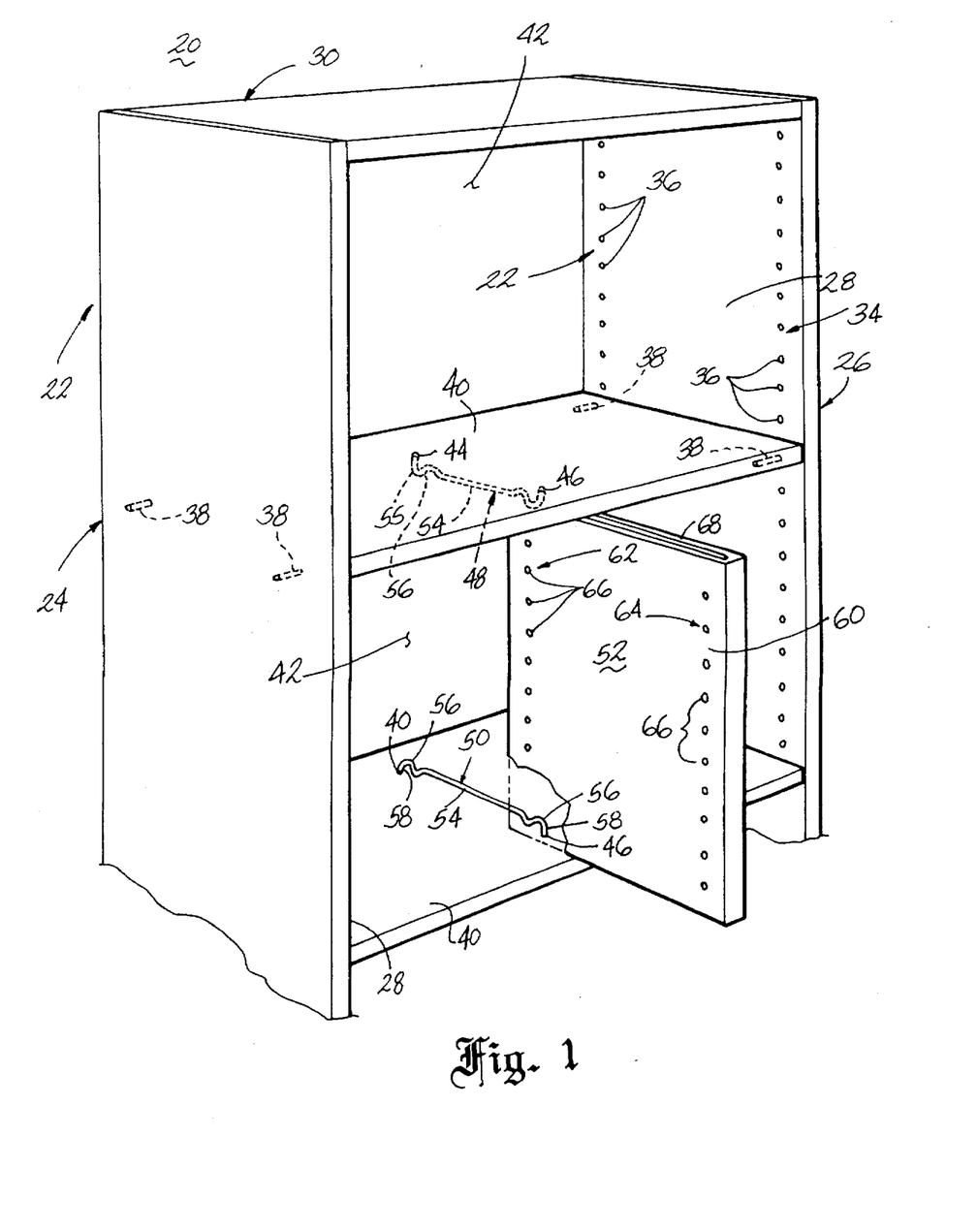
FIG. 1 is a perspective view of an adjustable storage system according to the invention showing the mounting of a vertical divider according to the invention to a prior art shelving structure.

This invention relates to an adjustable storage system 20 which provides the flexibility to allow customization to fit individual and changing needs. As seen in FIG. 1, the system 20 can include, or can be retrofitted to, a shelving system 22 which typically comprises first and second vertical supports 24 and 26, respectively, each having an interior surface 28. The upper and lower edges of the first and second vertical supports 24 and 26 are typically rigidly mounted to a top horizontal panel 30 and a bottom horizontal panel (not shown) to form a rigid rectangular frame. The interior surface 28 of each of the first and second vertical supports 24 and 26 are each provided with first and second parallel columns 32 and 34 of mounting recesses 36 adjacent each outer vertical edge of the first and second vertical supports 24 and 26. Each of the recesses 36 in the first column 32 is typically in horizontal alignment with a corresponding recess 36 in the second column 34. Support members 38 are fixedly or removably mounted within recesses 36 to horizontally support each corner of a rectangular shelf 40 thereon. To adjust the vertical height of the shelf 40, a different set of support members 38 can be mounted within a different set of recesses 36, or the support members 38 can be moved to a different height. A volume defined between a pair of shelves 40, or between a shelf 40 and the top or bottom panels, defines a usable storage area 42 therebetween. The support member 38 can comprise a rigid pin, a bent wire retainer member, a cam lock member, or any suitable component for mounting within the recesses 36 to support a horizontal panel.

The storage system 20 can be adapted so that the usable storage area 42 is divided into smaller modules by a pair of wire retainer members 48 and 50 and a vertical divider 52. In this embodiment, the horizontal members in the system 20, including the shelves 40, the top panel 30 and the bottom panel (not shown), can be provided with first and second recesses 44 and 46 adjacent the rearward and forward edges of each member. It will be understood that the recesses 44 and 46 can be positioned at any location along the width of the horizontal member but that the recesses should define a line parallel to the edges of the member which engage the vertical supports 24 and 26.

The wire retainer members 48 and 50 each comprise an elongated wire portion 54 and a pair of S-shaped flanges 56 at each end thereof which terminate at perpendicularly-disposed support members 58 with respect to the elongated portion 54. The vertical divider 52 comprises a panel 60 having first and second columns 62 and 64 of mounting recesses 66 on each side thereof. The first and second columns 62 and 64 are of similar orientation as the columns 32 and 34 of recesses 36. Upper and lower faces of the panel 60 are provided with a longitudinally-extending slot 68 which begins adjacent a forward edge of the panel 60 and terminates at a rearward portion of each face. The rearward portion of the slot 68 (not shown) can extend through a rearward edge (not shown) of the panel 60. It will be understood that the slots 68 on the panel 60 are of a width to snugly receive a wire retaining member therein.

The wire retaining members 48 and 50 are installed to the horizontal members in the system 20, such as shelves 40, by press-fitting the support members 58 of the wire retaining members 48 and 50 into the first and second recesses 44 and 46 of the shelves 40. As shown in FIG. 1, the first wire retaining member is mounted to the underside of a shelf 40 and the second wire retaining member is mounted on an upper surface of a shelf 40 immediately therebelow. The S-shaped flanges 56 can be in some degree of compression when the member is mounted in the recesses 44, 46 to enhance the friction fit of the retaining members 48 and 50 therein. The divider panel 52 is then mounted to the wire retaining members by slidably receiving the wire retaining members 48 and 50 within the slots 68 on the upper and lower faces of the panel 60, thus dividing a usable storage area 42 into additional modular storage spaces.

Once the storage space has been divided to an appropriate width by the panel 52, then specially-designed storage accessory components can be mounted within the divided space to further increase the storage capacity of the usable storage area 40. A first embodiment of one such component is a shelf, shown at 70 in FIG. 2, which can be mounted in more than one orientation, such as in horizontal or inclined positions. It will be further understood that the usable storage area 42 must be subdivided into a particular modular width, height and depth so that the shelf 70 can be mounted thereto and maximize the storage capacity therein.

Figure 2:
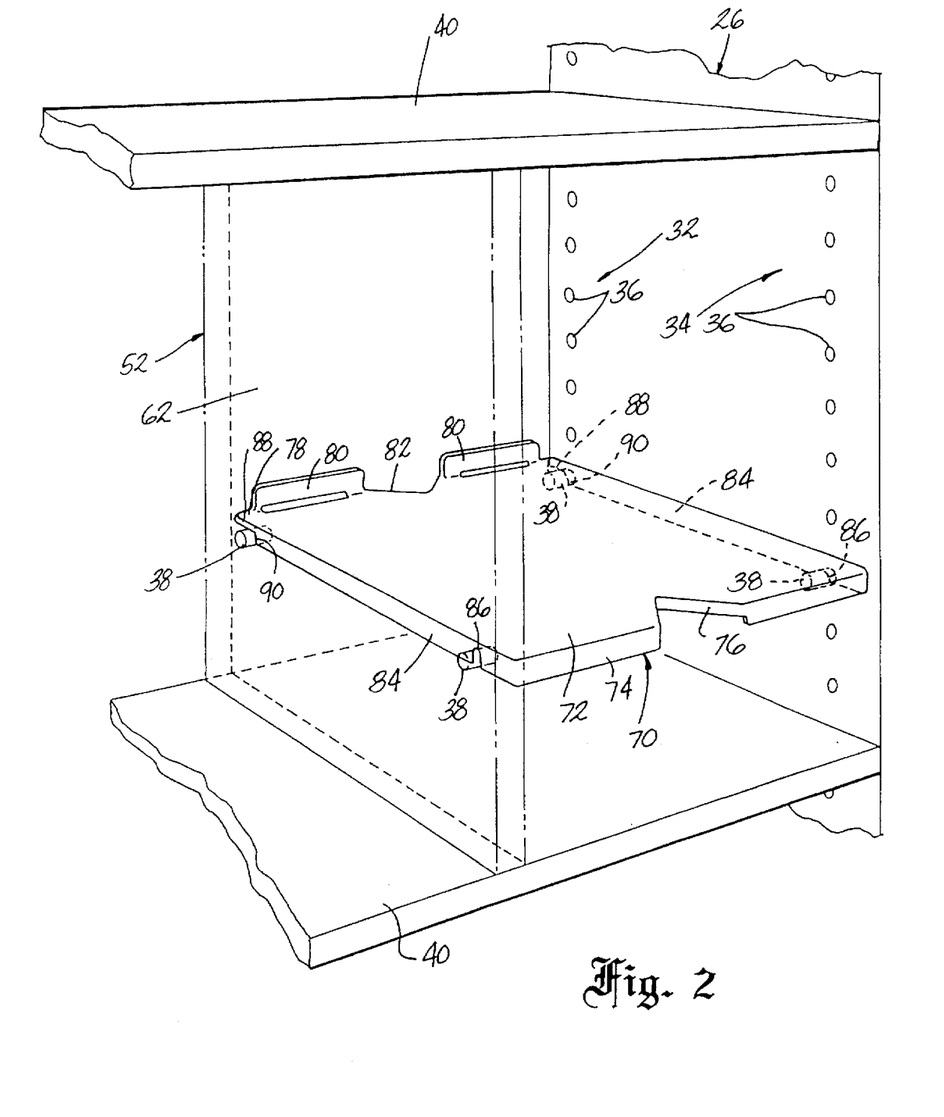
FIG. 2 is a fragmentary perspective view of the adjustable storage system showing the mounting of a first embodiment of a shelf in a horizontal orientation to the shelving structure of FIG. 1.

FIG. 2 shows the shelf 70 mounted to the shelving system 22 in a horizontal orientation. The shelf 70 comprises a panel 72 having a forward edge 74 provided with an inwardly-extending notch 76 and a rearward edge 78 provided with a pair of spaced-apart upwardly-extending flanges 80 and an inwardly-extending notch 82 provided therebetween. The shelf 70 also includes a pair of opposed side edges 84, each of which is provided with a first discontinuity such as a notch 86 extending upwardly from a bottom edge thereof and a second discontinuity such as a channel 88 extending rearwardly therefrom which defines a shoulder 90 therein.

To mount the shelf 70 in a horizontal position, four support members 38 must be mounted in the appropriate recesses 36 and 66 in the vertical supports 24 and 26 and/or the divider panel 52. The shelf 70 is then located over the support members 38 so that a pair of forward support members 38 are received within the notch 86 in each side edge 84 of the shelf 70. The shelf 70 is then rotated into a horizontal position so that a pair of rearwardly-located support members 38 are received within the channel 88 and abut the shoulder 90. It will be understood that the notches 86 and the channel 88 can be provided with releasable detents or spring clips to hold the shelf 70 in place. Alternatively, the rearwardly-located support members 38 can first be received within the channel 88 and then rotated so that the notches 86 receive the forwardly-located support members 38.

Figure 3:
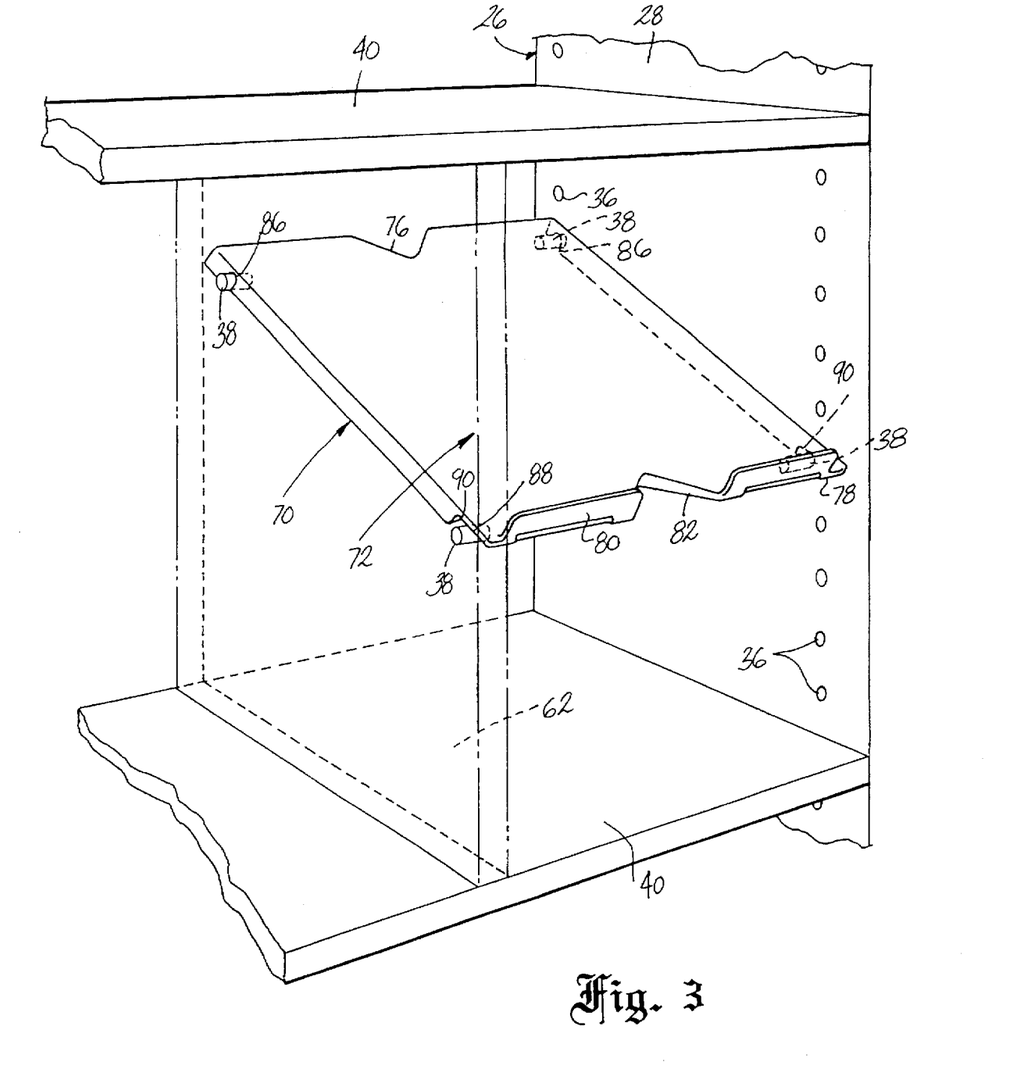
FIG. 3 is a fragmentary perspective view of the adjustable storage system showing the mounting of a first embodiment of a shelf in a non-horizontal orientation to the shelving structure of FIG. 1.

FIG. 3 shows the shelf 70 mounted in an inclined orientation. In order to incline the shelf 70 as shown, the shelf must be rotated 180 degrees about a vertical axis so that the flanges 80 on the rearward edge 78 of the shelf 70 are located near the front of the shelving unit. The purpose of the flange 80 is to retain materials stored on the shelf 70 when the shelf 70 is in an inclined position in which the edge 74 is mounted at a height greater than the edge 78. In this position, materials resting on the shelf 70 would tend by gravity to slide toward the flange 80.

As shown in FIG. 3, the shelf 70 can be located in an inclined position by first mounting four support members 38 in appropriate recesses 36 and 66 so that the pair of rearward support members are positioned at a height greater than the pair of forward support members. The shelf 70 is then moved into position over the support members 38 so that the rearward set of support members 38 is received in the notches 86. The shelf 70 is then rotated into an inclined position so that the forward set of support members 38 is received in the channels 88 of the shelf 70. The incorporation of the channels 88 into the shelf 70 accommodates variable spacing between the front and rear mounting support members that inherently arises as the incline of the shelf is altered. Conversely, the incorporation of the notches 86 provides a secure mounting of the shelf 70 to the pair of support members to accommodate the inclined orientation.

Figure 4:
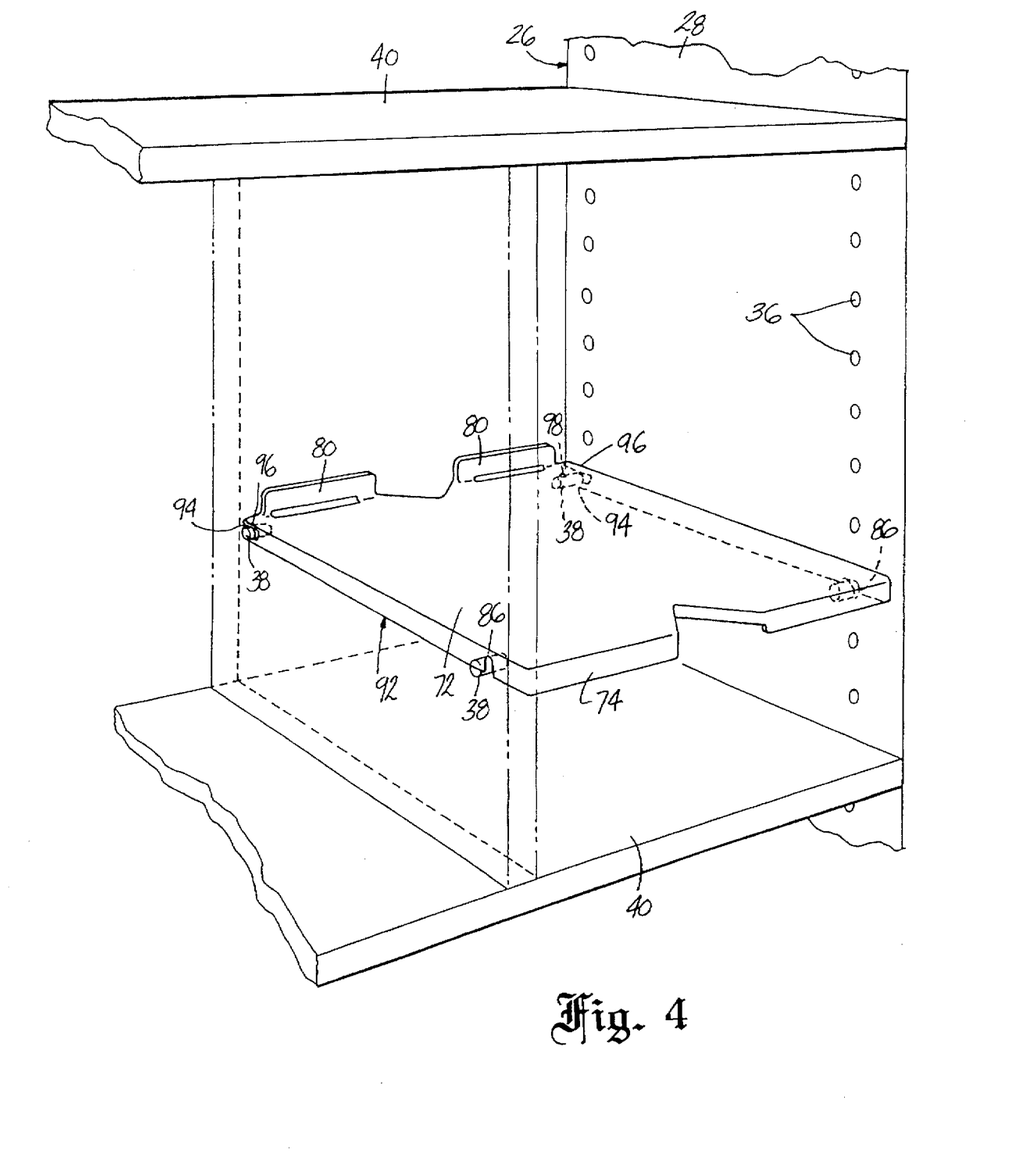
FIG. 4 is a fragmentary perspective view of the adjustable storage system showing the mounting of a second embodiment of a shelf in a horizontal orientation to the shelving structure of FIG. 1.

FIG. 4 shows a second embodiment of a shelf for the storage system 20, shown generally at 92. It will be understood that common reference numerals are used on identical components and elements of FIG. 4 and the remaining portion of this specification to refer to similar components and elements of FIGS. 1–3. The second embodiment the shelf 92 includes a forward edge 74, a rearward edge 78, a pair of side edges 84, forward notches 86 on each side edge 84, and upwardly-extending flanges 80 on the rearward edge 78. The second embodiment of the shelf 92 includes a modified rearward channel which is shown as a slot 94 defined by a pair of upper and lower cantilevered flanges 96 and 98, respectively. The slot 94 extends forwardly along each side edge 84.

The slot 94 is designed to support the rearward edge 78 of the shelf 92 on a pair of support members. The longitudinal length of the slot 94 can be varied so that the shelf 92 can be supported in a shelving system 22 of varied depths and at a variety of angles.

The shelf 92 is mounted in a horizontal or an inclined position by again mounting a pair of forward and rearward support members 38 within recesses 36 and/or 66 in a common plane. The shelf 92 is then positioned so that the rearward set of support members 38 is received within the slot 94. The shelf 92 is then rotated downwardly until the forward set of support members 38 is received in the notches 86 adjacent the forward edge 74. As before, the shelf 92 is mounted in an inclined position by rotating the shelf 92 180 degrees about a vertical axis so that the flanges 80 are positioned in a forward direction.

Figure 5:
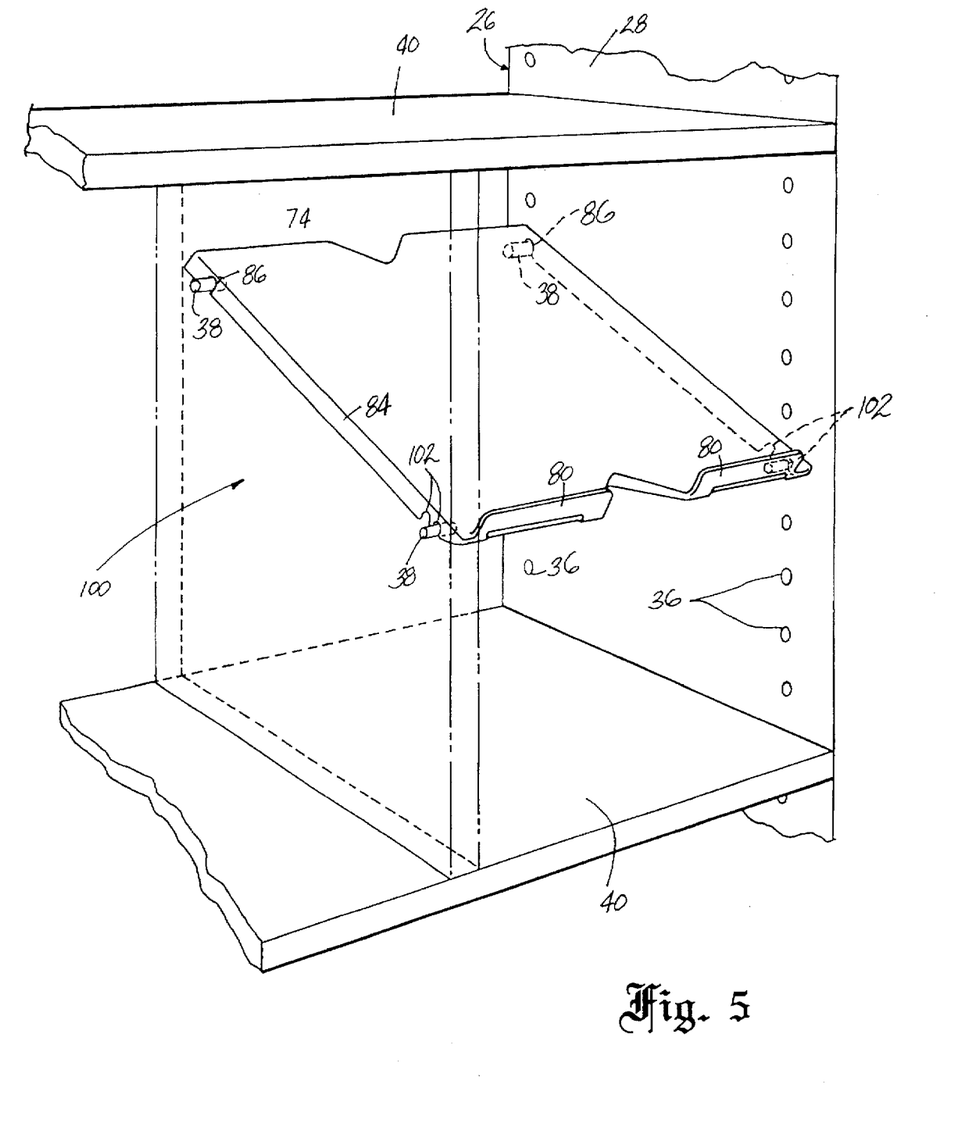
FIG. 5 is a fragmentary perspective view of the adjustable storage system showing the mounting of a third embodiment of a shelf in non-horizontal orientation to the shelving structure of FIG. 1.

FIG. 5 shows a third embodiment of the shelf, shown generally at 100, which includes a forward edge 74, a rearward edge 78, a pair of side edges 84, forward notches 86 on each side edge 84, and upwardly-extending flanges 80 on the rearward edge 78. The shelf 100 also includes several additional notches 102 provided adjacent the rearward edge 78 in a configuration similar to the notches 86 adjacent the forward edge 74. Although two notches are shown, any number of notches 102 greater than two can be provided along the longitudinal length of the side edges 84. The additional rearward notches allow for various positioning of the shelf 100. For example, one notch 102 could receive support members 38 when the shelf 100 is to be mounted in a horizontal position, and a different notch 102 could receive support members 38 when the shelf 100 is to be positioned at a prescribed incline.

Figure 6:
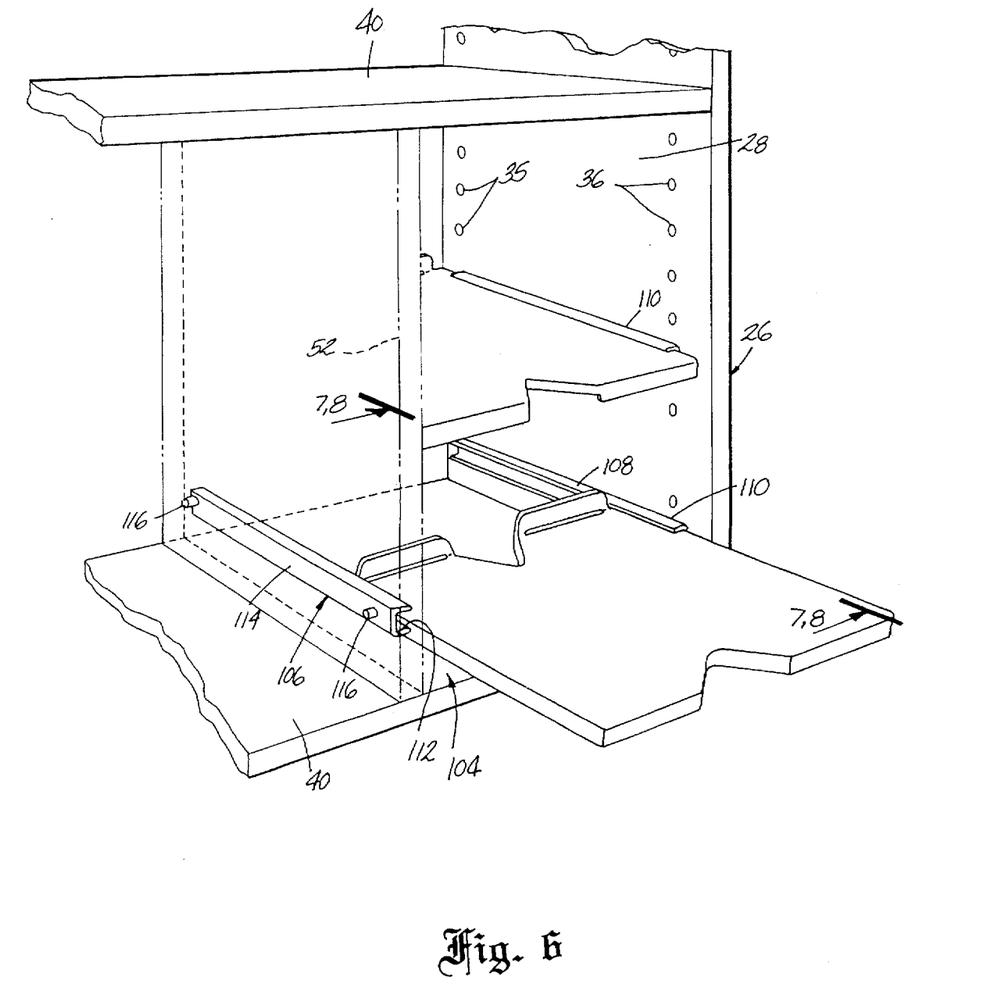
FIG. 6 is a fragmentary perspective view of a fourth embodiment of the adjustable storage system showing the slidable mounting of a shelf in runners.
Figure 7:
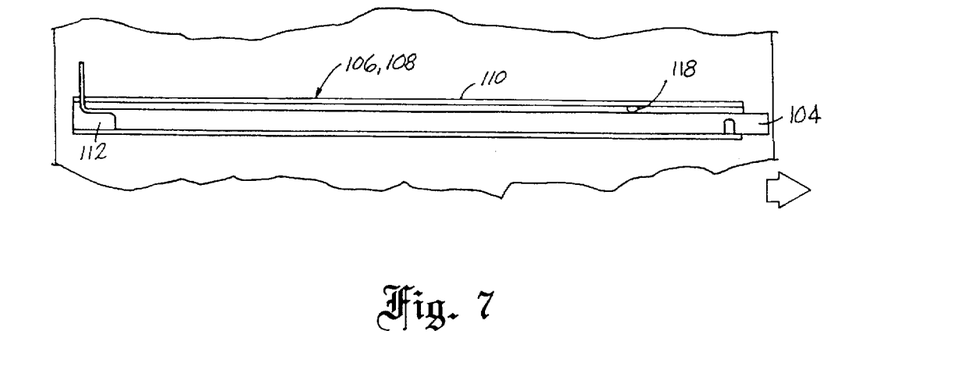
FIG. 7 is a cross-sectional view of the adjustable storage system showing a shelf in a retracted position taken along lines 7—7 of FIG. 6.
Figure 8:
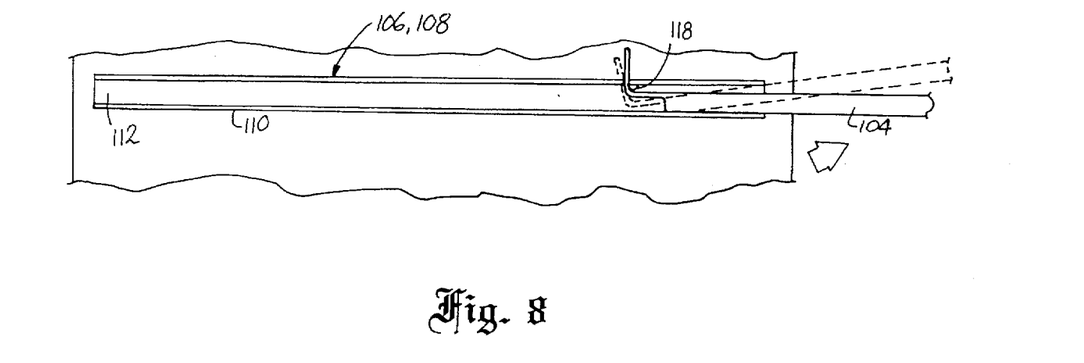
FIG. 8 is a cross-sectional view of the adjustable storage system showing a shelf in an extended position taken along lines 8—8 of FIG. 6.

FIG. 6 shows a fourth embodiment of the storage system 20 having a shelf, shown generally at 104, mounted for slidable movement between a retracted and an extended position in first and second runners 106 and 108. It will be understood that the shelf 104 can be any of the embodiments of the shelf discussed in this specification. FIGS. 7 and 8 show a cross section of the shelf 104 mounted in a runner 106 and/or 108, located in the retracted and the extended positions, respectively.

Each runner 106 and 108 comprises an elongated C-shaped body 110 defining a longitudinal groove 112 therein. A vertical sidewall 114 on the body 110 includes a pair of spaced support members 116 which correspond in alignment to the first and second columns of recesses on the vertical members 24 and 26 and the vertical divider 52. The body 110 also includes a transverse rib 118 which can protrude downwardly within the groove 112 and outwardly thereof.

The support members 116 on the runners 106 and 108 are press fit into a set of horizontally-aligned recesses 36 or 66 to mount the runners to the vertical members 24 and 26 and the divider 52, respectively. Each of the side edges 84 of the shelf 104 are then slidably received in the oppositely-facing grooves in the runners 106 and 108.

The shelf 104 is then mounted for slidable movement within the runners 106 and 108 between a retracted position (FIG. 7) and an extended position (FIG. 8). The rib 118 on the runners 106 and 108 acts as a stop to prevent the shelf from being completely removed from the runners 106 and 108. The forward edge of the shelf 104 can be urged angularly upwardly to disengage the ribs 118 from the shelf 104 to allow the shelf 104 to be removed from the runners 106 and 108.

Figure 9:
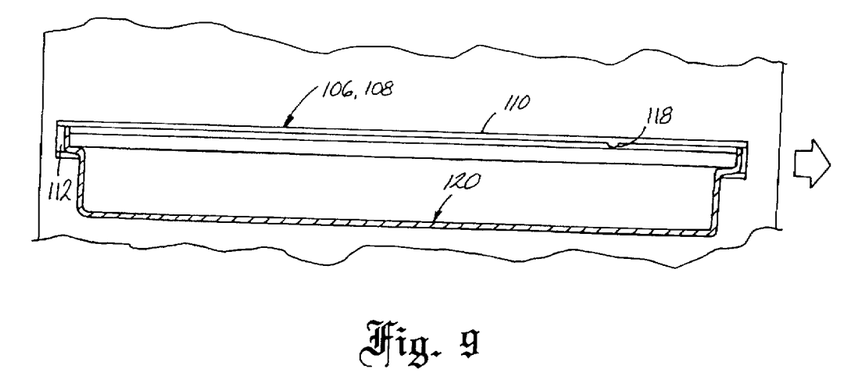
FIG. 9 is a cross-sectional view of a fifth embodiment of the adjustable storage system showing a tray in a retracted position taken along lines 7—7 of FIG. 6.
Figure 10:
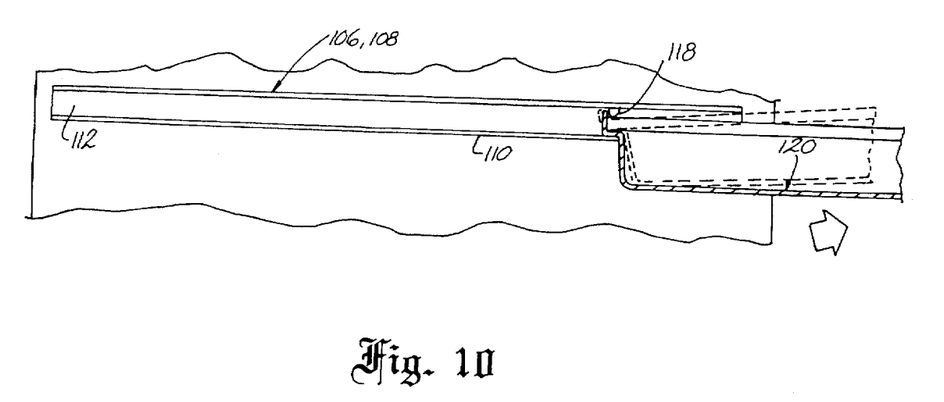
FIG. 10 is a cross-sectional view of a fifth embodiment of the adjustable storage system showing a tray in an extended position taken along lines 8—8 of FIG. 6.

FIGS. 9–10 show cross sectional views of a fifth embodiment of the storage system 20 having a storage well such as a shelf, a drawer or a tray, shown generally at 120, which can be provided with internal dividers to provide additional organization. The tray 120 can be mounted within runners 106 and 108 for slidable movement between a retracted position (FIG. 9) and an extended position (FIG. 10). Alternatively, the tray 120 can rest on a set of support members 38 mounted within recesses 36 and/or 66 on the vertical members.

Figure 11:
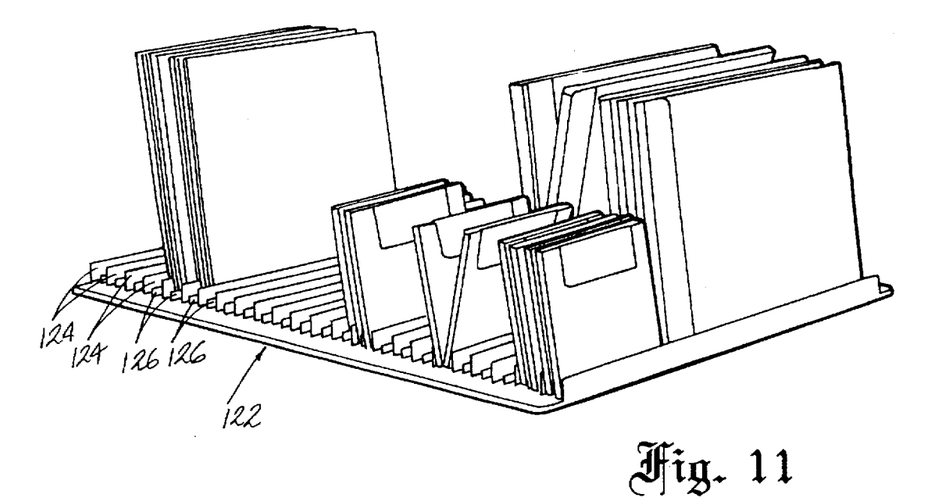
FIG. 11 is a perspective view of a an embodiment of a tray for of the adjustable storage system according to the invention.
Figure 12:
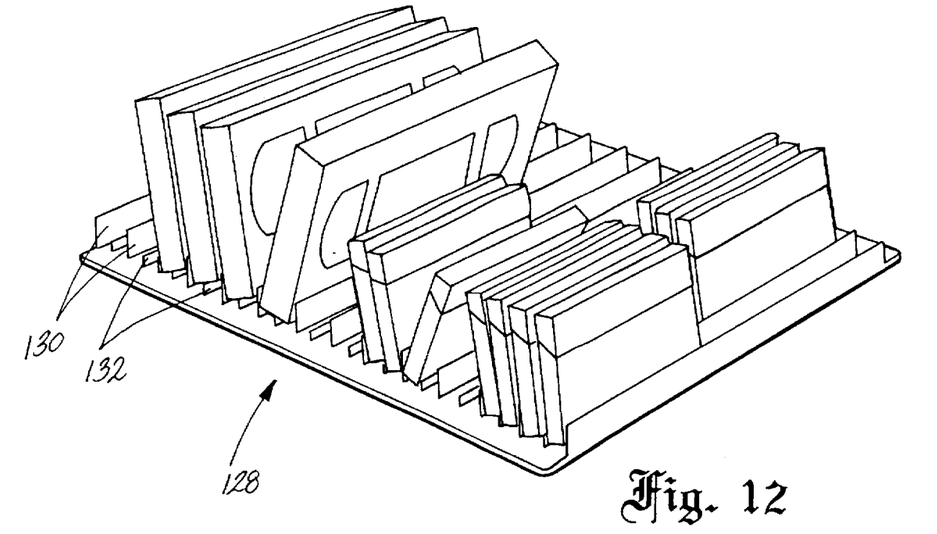
FIG. 12 is a perspective view of a an alternative embodiment of a tray for of the adjustable storage system according to the invention.
Figure 13:
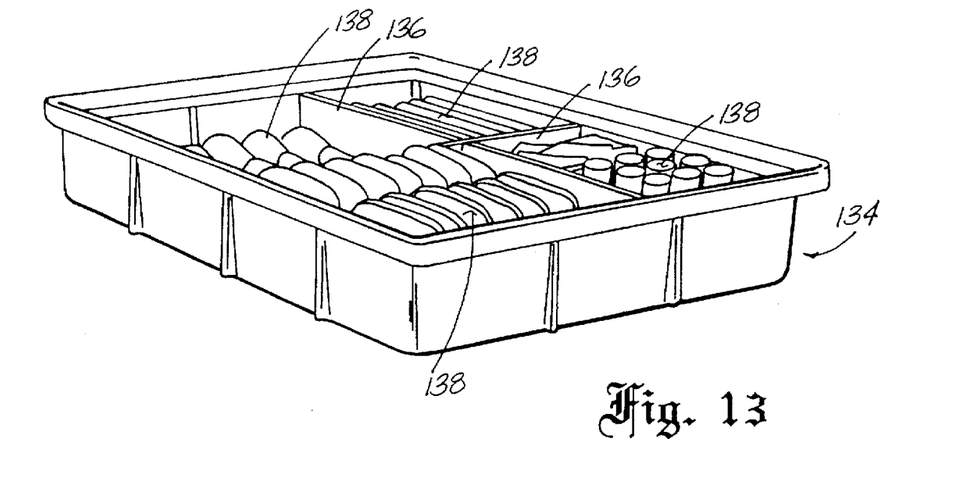
FIG. 13 is a perspective view of an alternative embodiment of tray for of the adjustable storage system according to the invention.
Figure 14:
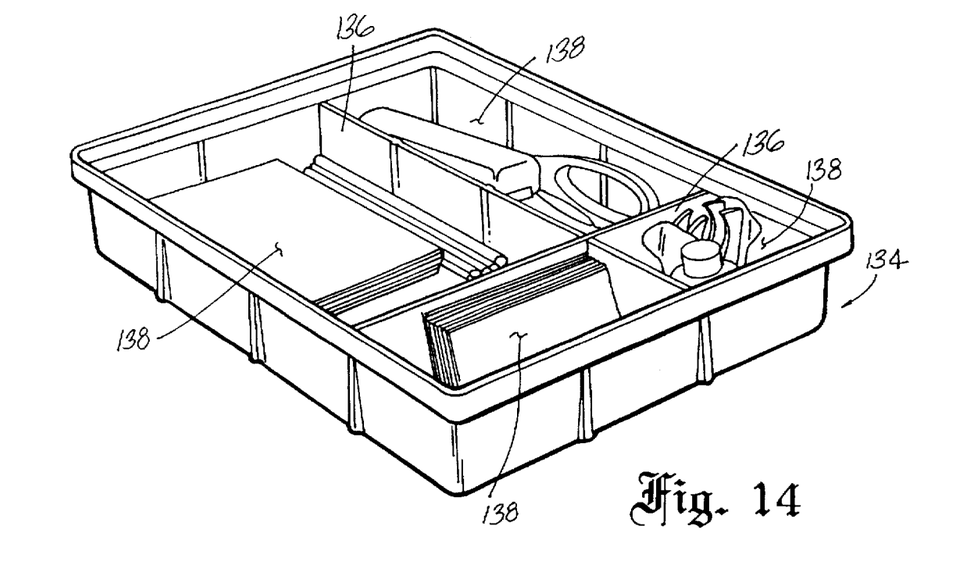
FIG. 14 is a perspective view of a an alternative embodiment of a tray for of the adjustable storage system according to the invention.

FIGS. 11–14 show various embodiments of the shelf for the storage system 20. FIG. 11 shows a shelf 122 having several transversely-oriented parallel slats 124 and 126 mounted in close proximity for storing small items such as office supplies and computer media (such as CD-ROMs and micro disks). FIG. 12 shows a shelf 128 having several transversely-oriented parallel slats 130 and 132 mounted in slightly wider proximity than the previous embodiment for storing items such as office supplies, audio tapes and video tapes. FIGS. 13–14 show a tray 134 having several internal divider panels 136 which form several variably-sized storage compartments 138 for storage of groups of small items (FIG. 13) or various office supplies (FIG. 14). The shelves can also be provided with product-specific storage components designed to receive a particular item.

Reasonable variation and modification are possible within the spirit of the foregoing specification and drawings without departing from the scope of the invention.

The embodiments for which an exclusive property or privilege is claimed are defined as follows:

1. A storage system comprising:
   a first vertical panel having an interior surface and a plurality of recesses formed on the interior surface, the recesses being aligned into two vertical columns;
   a second vertical panel having an interior surface and a plurality of recesses formed on the interior surface, the recesses being aligned into two vertical columns, the second vertical panel being provided a spaced distance from the first vertical panel so that the interior surfaces of the two vertical panels are opposed to one another;
   a plurality of support members mounted in the recesses so that at least one support member is provided in each of said columns for both the first and second vertical panels; and
   at least one shelf member comprising:
      a planar surface;
      a transverse edge and a pair of opposed side edges;
      a pair of first discontinuities formed in the side edges, one in each side edge, each of the first discontinuities being adapted to receive one of said support members therein and at least one of said first discontinuities being adapted to restrict forward and rearward movement of the at least one shelf member with respect to the support members and first and second vertical panels;
      a pair of second discontinuities formed in the side edges, one in each side edge, each of said second pair of discontinuities being elongated in a direction parallel to the planar surface;
      whereby, when the first discontinuities each receive a support member, the second discontinuities can be selectively positioned to receive a support member so that the shelf member will lie in a predetermined angular orientations.

2. The storage system of claim 1 wherein at least one of said first and second vertical panels comprises a divider panel.

3. The storage system of claim 1 and further comprising first and second horizontal support panels, each of said horizontal support panels having an interior surface and each panel being mounted to the first and second vertical panels so that the interior surfaces of the two horizontal support panels oppose one another.

4. The apparatus of claim 3 wherein at least one of the first and second horizontal support panels includes a pair of spaced recesses and further comprising at least one wire retainer member which is mounted to the pair of spaced recesses said at least one first and second horizontal support panels of the first horizontal support panel and a second wire member mounted in the spaced recesses of the second support panel.

5. The apparatus of claim 4 wherein said divider panel further comprises upper and lower surfaces thereon, said upper and lower surfaces provided with first and second slots.

6. The apparatus of claim 5 wherein said slots on said divider panel receive said wire retainer members to mount the divider panel to said horizontal support panels.

7. The apparatus of claim 1 wherein said pair of first discontinuities further comprises at least one rounded notch on each side edge thereof.

8. The apparatus of claim 1 wherein said pair of second discontinuities comprises a longitudinally-extending slot on at least two side edges.

9. The apparatus of claim 9 and further comprising first and second runners, said first and second runners adapted to receive a shelf member for slidable movement therein between a retracted position and an extended position.

10. The apparatus of claim 9 wherein said runners comprise an elongated body having a rearward surface, said rearward surface provided with a pair of spaced support members adapted to be received in said recesses of said vertical support panels.

11. The apparatus of claim 9 wherein said runners include a raised rib whereby said raised rib prevents said shelf member from being axially removed from said runners during slidable movement therein.

12. The apparatus of claim 1 wherein said at least one shelf member is provided with a plurality of spaced slats which support various stored articles therebetween.

13. The apparatus of claim 1 wherein said at least one shelf member comprises a storage well having at least one divider mounted therein.

* * * * *

UNITED STATES PATENT AND TRADEMARK OFFICE
CERTIFICATE OF CORRECTION

PATENT NO.: 5,762,213

DATED: June 9, 1998

INVENTOR(S): William R. Heneveld, Sr.

It is certified that error appears in the above-identified patent and that said Letters Patent is hereby corrected as shown below:

On the title page, insert the following:

--Related U.S. Application Data

[60]  Provisional application No. 60/002,634, August 22, 1995.--:

Claim 9, line 24, column 2:

"9" should be --1--.

Claim 1, line 37, column 1:

"orientations" should be --orientation--.

Signed and Sealed this

Eighth Day of December, 1998

*Attest:*

BRUCE LEHMAN

*Attesting Officer*  *Commissioner of Patents and Trademarks*